United States Patent
Schaeck

(10) Patent No.: US 7,222,151 B1
(45) Date of Patent: May 22, 2007

(54) TECHNIQUE FOR COMMUNICATION WITH MOBILE DATA PROCESSING DEVICES BY WAY OF MOBILE SOFTWARE AGENTS

(75) Inventor: Thomas Schaeck, Achern (DE)

(73) Assignee: International Business Machines Corporation, Armonk, NY (US)

(*) Notice: Subject to any disclaimer, the term of this patent is extended or adjusted under 35 U.S.C. 154(b) by 588 days.

(21) Appl. No.: 09/691,324

(22) Filed: Oct. 18, 2000

(30) Foreign Application Priority Data

Nov. 17, 1999  (EP) .................. 99122834

(51) Int. Cl.
G06F 15/16 (2006.01)
G06F 15/173 (2006.01)

(52) U.S. Cl. ..................... 709/202; 709/223

(58) Field of Classification Search .......... 709/202, 709/223, 217; 713/171; 719/328; 380/2; 703/25; 717/104; 370/468; 455/419, 500, 455/3.04, 39; 345/736
See application file for complete search history.

(56) References Cited

U.S. PATENT DOCUMENTS

| | | | |
|---|---|---|---|
| 5,954,797 A * | 9/1999 | Sidey | 709/223 |
| 6,144,739 A * | 11/2000 | Witt et al. | 380/2 |
| 6,266,805 B1 * | 7/2001 | Nwana et al. | 717/104 |
| 6,272,536 B1 * | 8/2001 | van Hoff et al. | 709/217 |
| 6,330,588 B1 * | 12/2001 | Freeman | 709/202 |
| 6,393,386 B1 * | 5/2002 | Zager et al. | 703/25 |
| 6,407,751 B1 * | 6/2002 | Minami et al. | 715/736 |
| 6,418,463 B1 * | 7/2002 | Blevins | 709/202 |
| 6,490,682 B2 * | 12/2002 | Vanstone et al. | 713/171 |
| 6,614,804 B1 * | 9/2003 | McFadden et al. | 370/468 |
| 6,622,157 B1 * | 9/2003 | Heddaya et al. | 709/202 |
| 6,643,506 B1 * | 11/2003 | Criss et al. | 455/419 |
| 6,671,745 B1 * | 12/2003 | Mathur et al. | 719/328 |
| 6,691,151 B1 * | 2/2004 | Cheyer et al. | 709/202 |

FOREIGN PATENT DOCUMENTS

| | | |
|---|---|---|
| JP | 11-184744 | 7/1999 |
| JP | 11-296490 | 10/1999 |

* cited by examiner

Primary Examiner—John Follansbee
Assistant Examiner—Kenny Lin
(74) Attorney, Agent, or Firm—Gregory M. Doudnikoff; Dillon Yudell, LLP

(57) ABSTRACT

A techinque for communicating with a mobile data processing device by way of a mobile software agent. Any application, such as a banking application which permits cash withdrawals from ATMs, can be represented as a mobile software agent. The mobile software agent is spread across a network to all terminals with cash dispensing functions. The terminals include a communication component having a mobile software agent interface function component and a mobile chipcard interface function component. The mobile software agent interface component provides support functions for receiving and installing the mobile software agent. The chipcard interface component safeguards the communication with the chipcard. The mobile software agent evaluates the information delivered to it from the mobile software agent interface component and then installs itself on the terminals as appropriate. Chipcard-related events are notified via the chipcard interface component to the mobile software agent which, after classifying the chipcard concerned, performs the actions on the chipcard. By implementating these interface components on every terminal in the network, administration of the chipcards in the network can be controlled from the backend system (server).

16 Claims, 4 Drawing Sheets

TECHNIQUE FOR COMMUNICATION WITH MOBILE DATA PROCESSING DEVICES BY WAY OF MOBILE SOFTWARE AGENTS

BACKGROUND OF THE INVENTION

1. Field of the Invention

The present invention describes a technique for communication with mobile data processing devices. More particularly, the present invention describes a technique for communicating with mobile devices, such as chipcards or mobile phones, via mobile software agents.

2. Description of the Related Art

Software agents, or also so-called intelligent agents, are becoming more and more important as the networking of systems becomes more widespread. Software agents are software modules located in a complex environment. The software agent has a sensor input, is able to change its environment, and has a set of goals which it wishes to attain by means of its actions. At present there are a large number of software agents with a wide variety of functions, such as interface agents, information agents, delinerative agents, reactive agents and mobile agents.

Of particular importance for the present invention is the mobile agent. Mobile agents are capable of roving around WANs (for example the World Wide Web). Usually the property of mobility is immediately associated with the term "agent" anyway.

This is not the case, however, because they interact with third-party systems (hosts), collect information and return the information to the user.

In addition to its autonomy, the mobile agent also has the functional property of cooperation capability. The advantage of the mobile software agent is that, by suitable programming, communication costs and times can be saved.

Whereas in the normal client/server sector all communication between the participants is over the network, when mobile software agents are used an agent can be sent over the network to handle the entire communication process locally, which means the computer's user does not have to be permanently online for the entire runtime.

Since mobile software agents rove between networks, software developers are primarily concerned with the problem of security. The issues of authentication (mutual knowledge of identity), authorization (right to use the desired function) and all problems connected with electronic funds transfer (ability/willingness of the agent to make payments; limitation of liability by users; performance guarantees) are key elements.

In the field of mobile software agents there is a state of the art which is concerned with migration, splitting and merging of agents. However, it is usually assumed that the mobile agents begin a task when they arrive at a system and return a result when they have completed that task.

No state of the art is known which describes a mechanism which in a particular way enables communication between the mobile agent and mobile data processing devices.

The approaches applied to date specify software running on terminal equipment which processes data received from backend systems and which can be updated by means of code update mechanisms. But it is not possible for code to migrate to terminals autonomously for specific tasks and interact at the destination with mobile devices.

SUMMARY OF THE INVENTION

It is therefore the object of the present invention to deliver a system and method which permits communication with mobile data processing devices by way of mobile software agents in a simple manner.

By additional implementation of a runtime environment (interface component) for distributed mobile software agents for administration of mobile data processing devices, e.g. chipcards, on every node of the network (client), administration of the mobile data processing devices in the network can be controlled from the backend system (server). The method adapts automatically to the network structure. Mobile software agents introduced into the system by way of the backend system automatically spread through the part of the system on which the runtime environment ("mobile software agent" interface component) is installed.

One example of application of the concept is a method for administration of chipcards in a complex networked system with the aid of event-controlled mobile software agents operating on a suitable infrastructure. Agents sent out into the network from backend systems spread according to predefined strategies across the network and respond to chipcards which are inserted into devices in which they have located themselves. On certain chipcards the local mobile software agent performs actions such as downloading a new application, removing an application or invalidating the entire card, where appropriate in cooperation with other agents in the network or with backend systems.

A further example of application of the concept is management of Pervasive Computing devices. Agents sent out into the network from backend systems spread according to predefined strategies across the network and respond to devices which enter the action range of the nodes on which agents are located and begin a communication. On certain PVC devices the local agent performs actions, where appropriate in cooperation with other agents in the network or with backend systems.

On the nodes of the network agent runtime environments ("mobile software agent" interface components) are preinstalled which enable the migration of administration agents onto the said nodes. The runtime environments provide the agents with the key basic functions, such as activation when mobile software agents appear, communication with cooperating software agents, communication with mobile software agents and communication with backend systems. The special feature of the runtime environment is that it includes a mechanism permitting it to inform the local agents of specific events, such as insertion or removal of a chipcard or the introduction or withdrawal of a mobile phone into or out of the action range. An agent can spread itself across several nodes by means of several migration and division processes, and then becomes inactive. Only when a specific event occurs, such as insertion or removal of a card, does the agent become active and begin its task.

The present invention will now be described with reference to the following drawings, wherein like reference numbers denote the same element throughout.

DESCRIPTION OF THE PREFERRED EMBODIMENT

Figure 1:
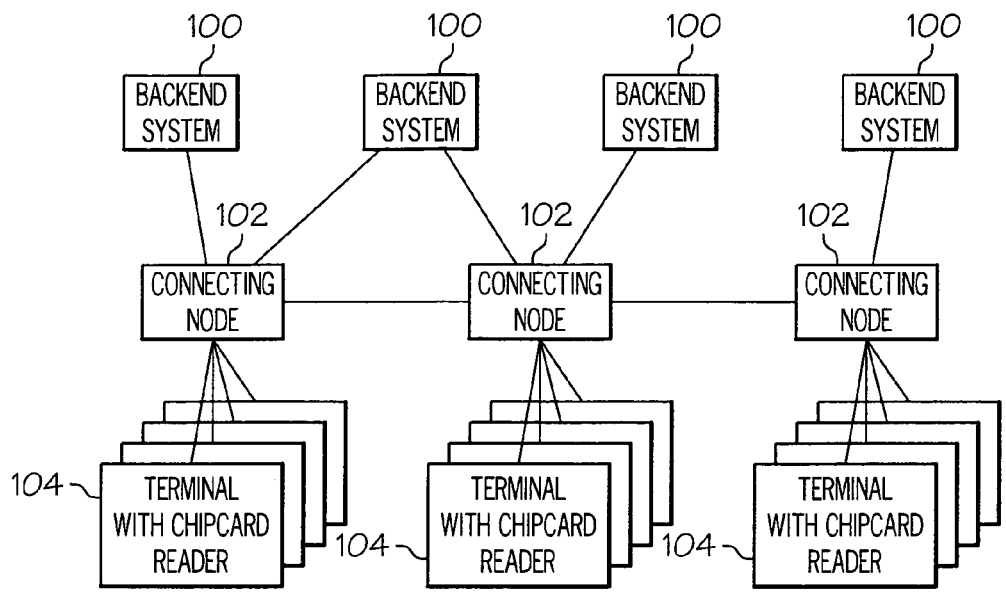
FIG. 1 shows the network architecture underlying the invention, comprising several backend systems, connecting nodes and terminal devices with chipcard readers.

FIG. 1 shows a communication architecture underlying the present invention. The communication architecture comprises several backend systems 100 and several connecting nodes 102 by way of which communication with respective terminal devices 104 is routed. In the preferred embodiment of the invention, the terminal device 104 is a data processing device to which a chipcard reader is connected.

Mobile software agents are introduced into the chipcard system from the backend systems 100 over the network. They spread automatically from the backend systems 100 via the connecting nodes 102 to the terminal devices 104 on which administrative tasks, such as downloading new applications onto cards, changing expiry dates or invalidating cards, can actually be carried out. By assigning a life span to the agents, it can be ensured that a generation of agents is automatically deleted after a certain period of time. Preferably, the generation of agents deletes itself.

Figure 2:
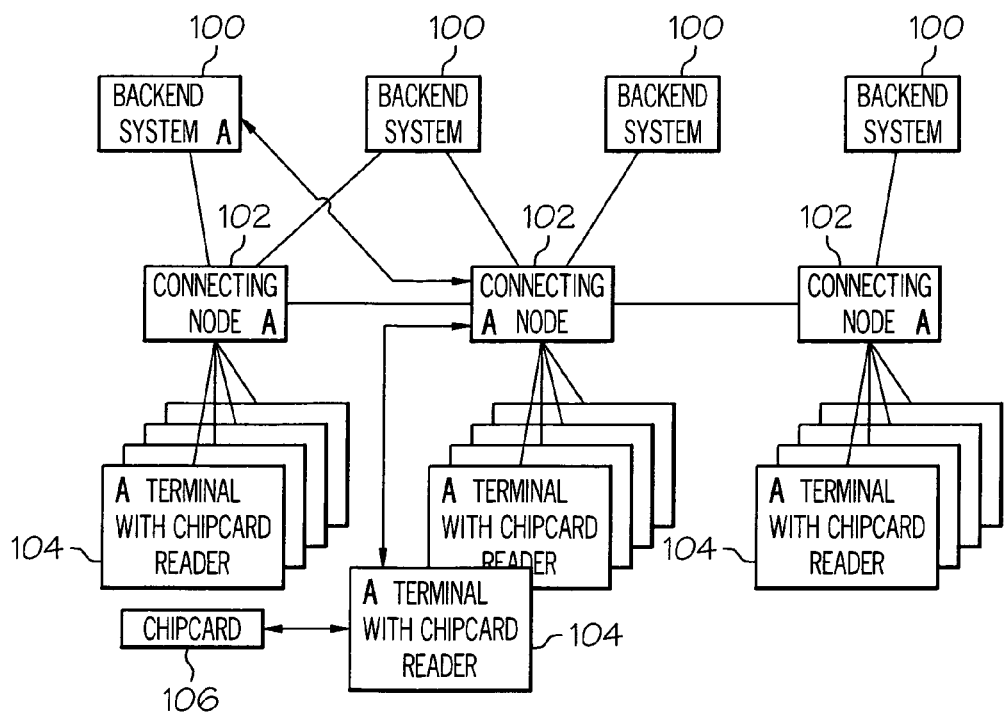
FIG. 2 shows the processing of a mobile software agent in ccordance with the invention in an architecture in accordance with FIG. 1.

FIG. 2 shows the spread of mobile software agents in the communication architecture of FIG. 1.

The basic mode of functioning of a mobile software agent is as follows. Originating from one of the backend systems 100, a mobile software agent A roves through the network and in the process is able to duplicate parts of itself and leave the parts behind on suitable nodes. Depending on the type of node on which they are located, agents can behave differently. An agent on a backend system 100, for example, can wait for messages from agents in the network and answer queries contained in the incoming messages by accessing a database. Agents on the connecting nodes 102 could serve as caches or passthroughs. Agents on terminal devices 104 with chipcard readers could wait for insertion of a card 106, read information from the card and send it to the backend system 100 from which they originate, receive and carry out instructions from the backend system 100 for administration of the card, and finally inform the backend system 100 of the result.

Figure 3:
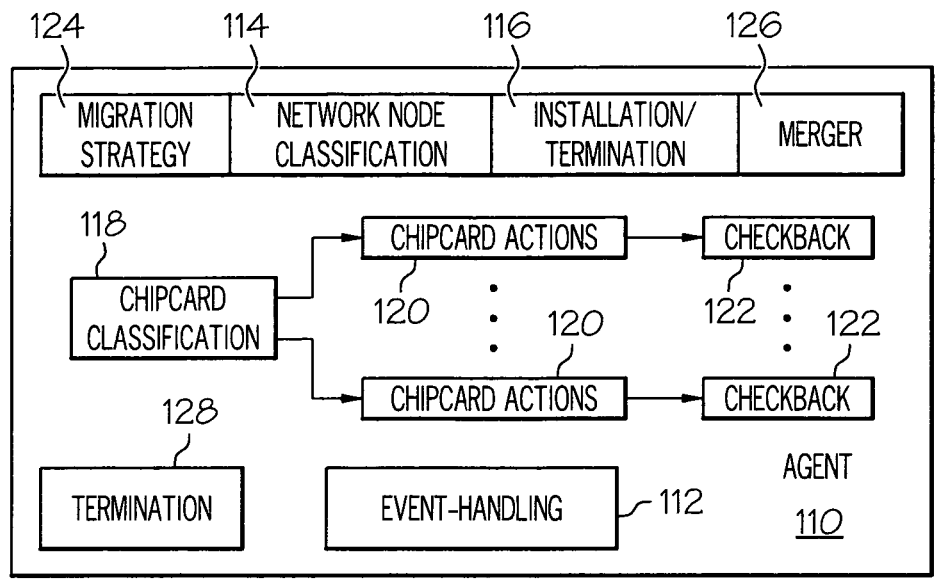
FIG. 3 shows the functional components of the mobile software agent in accordance with the invention.

FIG. 3 shows the functional components of a mobile software agent 110 in accordance with the invention. The mobile software agent 110 includes an event-handling component 112. Using the event-handling component 112, the mobile software agent responds to certain events of which it is informed by the runtime environment, such as the introduction of a mobile device into the action range or the insertion or removal of a chipcard into or out of a chipcard reader. The agent 110 also includes a node recognition component 114. The component 114 classifies network nodes. When the agent 110 migrates to a node, it determines whether the node is of a type on which it is capable of existing and carrying out its tasks. When the agent 110 has classified a node as suitable for it and has been accepted by the node, an installation/termination component 116 is utilized to install the agent 110 on the node. Further, when the agent 110 migrates to a node which already contains a predecessor agent now rendered obsolete by the migrating agent 110, the component 116 terminates the predecessor.

A device classification component 118 is also part of the agent 110. When a mobile device, such as a chipcard, appears in the action range of the agent 110, the agent 110 classifies the device. Device action components 120 include logic to be carried out relative to the devices. Depending on the result of the classification, the agent 110 performs actions such as invalidating a card or installing an additional application on the chipcard. After a successful or failed action, a checkback component 122 may be employed to checkback to other agents or to a backend system.

A migration strategy component 124 contains information relating to the destination for the agent 110 and/or where copies of the agent 110 should be replicated. In order to reach their destination, such as a single node or an area of a network, agents 110 migrate from node to node and/or replicate themselves on one or more nodes, creating a copy of the agent 110 on such nodes.

A merger component 126 helps to avoid wasting resources. Agents with common or similar tasks can be merged into one agent. Agents may have a specific life span at the end of which they must terminate themselves in order to make the resources taken up by them available to new agents. A self-termination component 128 handles this function.

Figure 4:
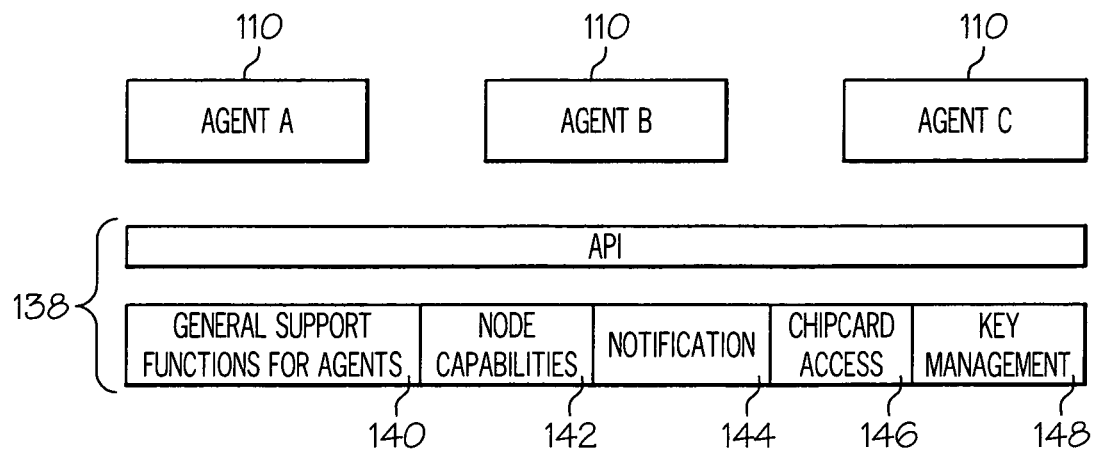
FIG. 4 shows the interface component for communication between the mobile software agent and the mobile data processing device.

FIG. 4 shows an interface component (runtime environment) 138 for communication between mobile software agents 110 and a mobile data processing device (not shown).

To enable the mobile software agents to execute the functions mentioned in connection with FIG. 3, an infrastructure which provides the agents with the necessary support is required. This infrastructure may be a network on the nodes of which an interface component is installed. A node must offer the certain interface components, whereby running of the components is dependent on the rights of the creator of the agent on the respective node. A support function component 140 handles a number of functions. These include reception of agents from the network, e.g., via a specific TCP/IP port, validation of the agents, e.g., by verification of a digital signature which guarantees the integrity of the agent and by byte code verification, running of agents on Java platforms, e.g., by executing the agent's byte code, remote monitoring of the agents running on the node, etc. (Java is a trademark of Sun Microsystems, Inc.)

A node capabilities component 142 provides agents with the information they need to make migration or installation decisions. Via a notification component 144, agents can have themselves notified of certain events, such as when chipcards are inserted into a chipcard reader. A mobile device access component 146 permits communication with mobile devices, such as chipcards. For chipcards, this may be carried out by means of the OpenCard Framework.

A key management component 148 permits management of keys in the system. It enables agents to import encrypted keys they carry with them safely into local security modules which may be installed in terminal devices.

Figure 5:
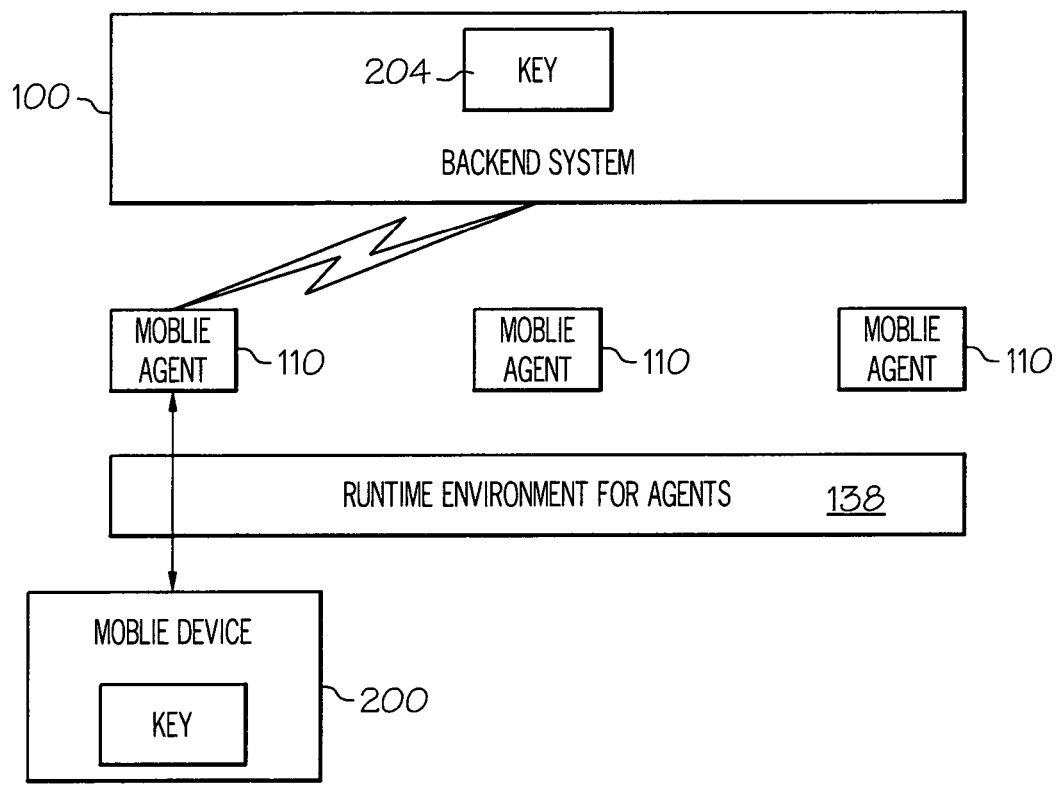
FIG. 5 shows an authentication architecture for mobile software agents.

FIG. 5 shows an authentication architecture for mobile software agents 110. The nodes are configured such that only secure mobile software agents 110, i.e., agents digitally validated by a backend system 100, are executed. Nodes and backend systems only accept messages from other nodes or backend systems which have a digital signature. This means it is not possible to communicate with the backend system 100 from a node outside the system in order to utilize the keys located there to create a signature which would enable actions to be carried out against a mobile device.

The software agent 110 can be authenticated to a mobile device 200 as follows. The software agent 110 receives from the runtime environment 138 a notification that the mobile device 200 has been activated. The software agent 110 requests a random number from the mobile device 200, which may be a chipcard. The software agent 110 sends the random number to a backend system 100 from which it itself originates. The backend system 100 signs the random number with a key 204 and sends the signed random number by way of the software agent 110 and the runtime environment 138 back to the mobile device 200. The mobile device 200 verifies the signature and only accepts the actions of the software agent 110 if it is correct.

This embodiment of the authentication architecture is based on the fact that only the mobile device 200 and the backend system 100 have a key.

Figure 6:
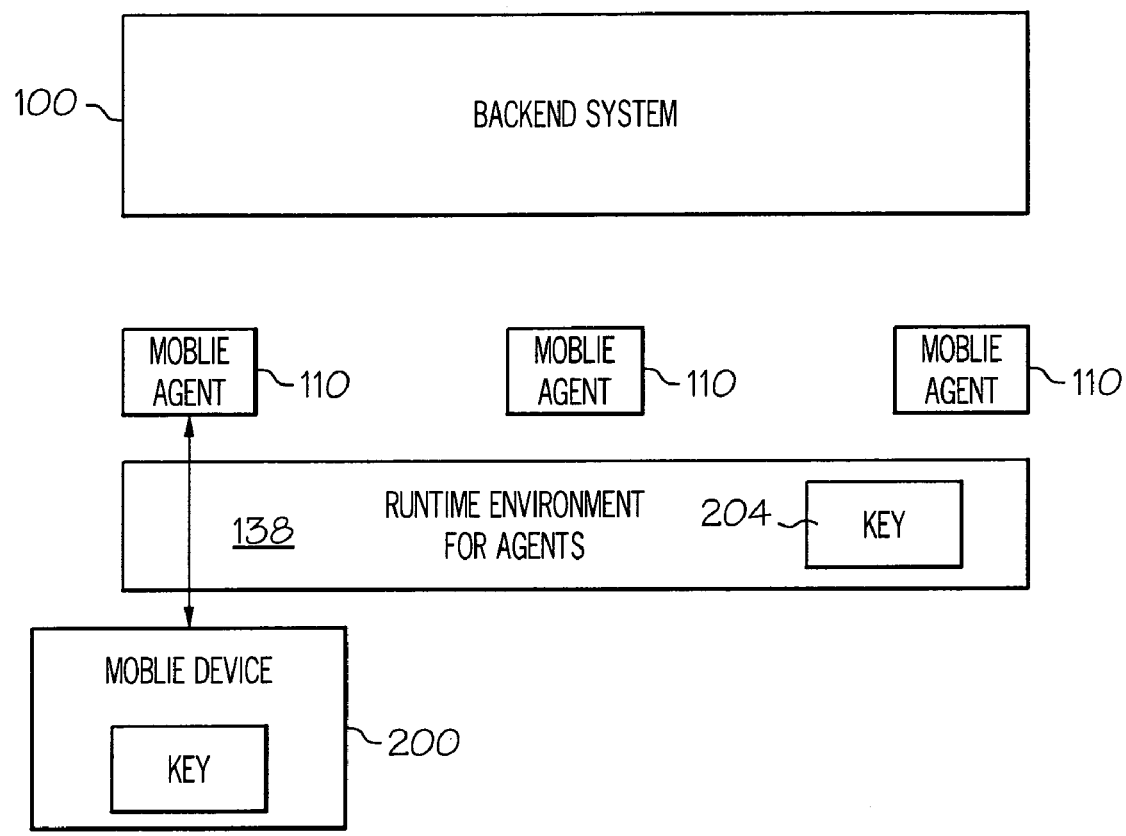
FIG. 6 shows a further authentication architecture for mobile software agents.

Another embodiment of the authentication architecture may involve a key 204 being stored only on the mobile device 200 and on the respective node. This variant is represented in FIG. 6. The authentication can then occur as follows. The mobile software agent 198 receives from the runtime environment 138 a notification that a mobile device 200 has been activated. The software agent 110 requests a random number from the mobile device 200. The software agent 110 has the runtime environment 138 sign the random number with a key 204 and sends the signed random number to the mobile device 200. The mobile device 200 verifies the signature and only accepts the actions of the software agent 110 if it is correct.

In the following, two preferred examples of the application of mobile software agents in accordance with the present invention are presented.

Invalidation of Cards

Cards can be invalidated in the following manner. The backend system which wants to invalidate certain cards creates its own agent and sends it out into the network. The agent spreads by migration and replication according to a strategy defined by the backend system over the areas of the network in which the card being invalidated may appear. On nodes already containing other, compatible agents likewise tasked with invalidating cards, the agent merges with them, whereby the resultant agent is tasked with invalidating the combined set of chipcards, including those to be invalidated by the original agents. One of the cards to be invalidated is inserted into a terminal on which one of the created agents is located. The agent detects the card and invalidates it. The agent notifies the backend system from which it originates as well as its associated agents. All notified agents remove the now invalidated card from their lists of cards awaiting invalidation. At the end of its life or on completion of its tasks, the agent terminates itself.

Installation of New Applications

New applications can be installed on chipcards by agents in the following manner. The backend system which wants to install an application creates its own agent and sends it out into the network. The agent spreads by migration and replication according to a strategy defined by the backend system over the areas of the network in which the card on which the application is to be installed may appear. On nodes already containing other, compatible agents likewise tasked with installing the same application, the agent merges with them, whereby the resultant agent is tasked with installing the application on the combined set of chipcards, including those on which the original agents were tasked to install it.

One of the cards is inserted into a terminal on which one of the created agents is located. The agent detects the card and installs the application. It may need to communicate with the backend system 100 from which it originates to do so, for example, if the necessary card commands can only be assigned the correct signatures or Message Authentication Codes (MACs) there. The agent notifies the backend system from which it originates as well as its associated agents. All notified agents remove the card from their lists of cards awaiting installation of the application concerned. At the end of its life or on completion of its tasks, the agent terminates itself.

When the runtime environment for distributed agents to administer chipcards has been installed on the nodes of the network, the administration of chipcards in the network can be controlled from the backend system. The method adapts automatically to the network structure. Mobile software agents introduced into the system automatically spread through the part of the system on which the runtime environment is installed.

The invention also permits the deployment of agents in environments with limited resources. Since key, frequently needed functions are provided to the agents from an Agent Framework on the nodes, the agents themselves can be very small. In addition, the merging of agents allows the number of agents in the system to be limited and thus conserves system resources.

The method can also be used to distribute off-card applications in the network. A banking application permitting cash withdrawals from ATMs could be represented as an agent which migrates only to terminals with a cash dispensing function, and based on the insertion of EC cards/credit cards dispenses cash instead of performing an administrative function.

The method adapts automatically to the network structure. Mobile software agents introduced into the system by way of the backend system automatically spread through the part of the system on which the mobile software agent interface component is installed.

While the present invention has been described relative to a specific preferred embodiment thereof, various modifications and changes may be obvious to one skilled in the art, and it is intended that the present invention encompass such changes and modifications as fall within the scope of the appended claims.

What is claimed is:

1. A system for communication with a mobile data processing device by way of a mobile software agent, said system comprising:
   means for transmitting the mobile software agent;
   means for spreading the mobile software agent from an originating system via a network to one or more destination systems;
   means for running the mobile software agent; and
   means for communicating, including a mobile software agent interface component for communicating with the mobile software agent, and a mobile data processing device interface component, for communicating with the mobile data processing device; wherein the mobile software agent includes an event-handling component to handle events communicated via the mobile data processing device interface component relating to the status of the mobile data processing device; a recognition component to recognize the destination system; an execution component to run on the destination system; a classification component to classify the mobile data processing device; one or more action components to perform specific actions on the mobile data processing device dependent on results from the classification component; a checkback component for checking back to the originating system or to other mobile software agents indicating whether installation on the one or more destination systems or the action being performed on the mobile data processing device succeeded or failed; a replication component for producing a copy of the mobile software agent for distribution to other destination systems; a merger component for merging several mobile software agents having like tasks into a single merged mobile software agent; and a self-termination component for terminating the mobile software agent after a preset life span or a defined event.

2. A system according to claim 1, wherein the mobile software agent further comprises:

a checkback component for checking back to the originating system or to other mobile software agents for indicating whether installation on the destination system or the action being performed on the mobile data processing device succeeded or failed;

a replication component for producing a copy of the mobile software agent in the destination systems;

a merger component to merge mobile software agents having like tasks into a single merged mobile software agent; and a self-termination component for terminating the mobile software agent after a preset life span or a defined event.

3. A system according to claim 1, wherein the mobile software agent interface component comprises:

a support component to receive the mobile software agent from the network on the destination system; and a component to deliver installation information for the destination system.

4. A system according to claim 3, wherein the mobile software agent interface component further comprises a component for secure storage of keys.

5. A system according to claim 3, wherein reception of the mobile software agent by way of the mobile software agent interface component is executed by means of TCP/IP protocol.

6. A system according to claim 1, wherein the mobile data processing device interface component has at least one communication component to detect events on the mobile data processing device and transmit the events to the mobile software agent.

7. A system according to claim 1, wherein the originating system is a backend system, the destination system is a data processing device with a chipcard reader and the mobile data processing device is a chipcard.

8. A system according to claim 1, wherein the mobile software agent interface component and the mobile data processing device interface component are installed on the destination system.

9. A system according to claim 1, wherein the mobile software agent interface component is identical for all mobile software agents and only the mobile data processing device interface component for the associated mobile data processing device needs to be installed.

10. A system according to claim 1, wherein the interface components can be downloaded to the destination systems over a network.

11. A system according to claim 1, further comprising an authentication component to authenticate the mobile software agent to the mobile data processing device.

12. A system according to claim 11, wherein the authentication component composes:

a first component to request a random number from a mobile data processing device, said first component being part of the mobile software agent;

a second component to transmit the random number to the originating system, said second component being part of the mobile software agent;

a third component to sign the random number by means of a key, said third component being installed on the originating system; and a fourth component to verify the signature, said fourth component being installed on the mobile data processing device.

13. A system according to claim 11, wherein the authentication component comprises:

a first component to request a random number from a mobile data processing device, said first component being part of the mobile software agent;

a second component to sign the random number by means of a key, said second component being part of said communicating means; and a third component to verify the signature, said third component being installed on the mobile data processing device.

14. A method for communication with a mobile data processing device by way of a mobile software agent, wherein the mobile data processing device is addressable via a network, said method comprising the steps of:

creating a mobile software agent;

spreading the mobile software agent across the network into one or more systems from an originating system;

delivering information to a software agent interface component for each of the systems for reception of mobile software agents from the network, including information for making migration or installation decisions;

evaluating the delivered information;

for each of the systems, installing the mobile software agent on the system if it is determined that the mobile software agent is intended for the system;

establishing a communication link between the mobile software agent and the mobile data processing device via a mobile data processing device interface component of the system;

classifying the mobile data processing device on establishment of a connection between the mobile data processing device and the mobile data processing device interface component;

performing actions of the mobile software agent on the mobile data processing device via the mobile data processing device interface component dependent on results of said classifying step;

checking back to the originating system or to other mobile software agents indicating whether installation on the one or more systems or the action being performed on the mobile data processing device succeeded or failed;

producing a copy of the mobile software agent for distribution to other systems;

merging several mobile software agents having like tasks into a single merged mobile software agent; and terminating the mobile software agent after a preset life span or a defined event.

15. A mobile software agent for use in communicating information from an origin system to a mobile data processing device associated with a destination node, said mobile software agent comprising:

a communication component for communicating with a mobile software agent interface component on the destination node;

a recognition component for recognizing the destination node;

an execution component to run on the destination node;

a classification component to classify the mobile data processing device;

one or more action components for performing specific actions on the mobile data processing device dependent on results from said classification component;

a checkback component for checking back to the originating system or to other mobile software agents indicating whether installation on the destination node or the action being performed on the mobile data processing device succeeded or failed;

a replication component for producing a copy of the mobile software agent for distribution to other destination systems;

a merger component for merging several mobile software agents having like tasks into a single merged mobile software agent; and a self-termination component for terminating the mobile software agent after a preset life span or a defined event.

16. A computer readable code stored on an originating system for permitting communication with a mobile data processing device by way of a mobile software agent, wherein the mobile data processing device is addressable via a network, said computer readable code comprising:

first subprocesses for spreading the mobile software agent across the network into one or more systems from the originating system;

second subprocesses for delivering information to a software agent interface component of each of the systems for reception of mobile software agents from the network, and including information for making migration or installation decision;

third subprocesses for evaluating the delivered information;

fourth subprocesses for installing the mobile software agent on the one or more systems if it is determined that the mobile software agent is intended for the one or more systems;

fifth subprocesses for establishing a communication link between the mobile software agent and the mobile data processing device via a mobile data processing device interface component of the system;

sixth subprocesses for classifying the mobile data processing device on establishment of a connection between the mobile data processing device and the mobile data processing device interface component;

seventh subprocesses for performing actions of the mobile software agent on the mobile data processing device via the mobile data processing device interface component dependent on results of the classification of said sixth subprocesses;

eighth subprocesses for checking back to the originating system or to other mobile software agents indicating whether installation on the one or more systems or the action being performed on the mobile data processing device succeeded or failed;

ninth subprocesses for producing a copy of the mobile software agent for distribution to other systems;

tenth subprocesses for merging several mobile software agents having like tasks into a single merged mobile software agent; and eleventh subprocesses for terminating the mobile software agent after a preset life span or a defined event.

* * * * *